UNITED STATES PATENT OFFICE.

FRANZ FUHRMANN, OF BERLIN, GERMANY.

METHOD OF MAKING MAGNESIUM-PEROXID COMPOUND.

SPECIFICATION forming part of Letters Patent No. 698,399, dated April 22, 1902.

Application filed January 7, 1902. Serial No. 88,786. (No specimens.)

*To all whom it may concern:*

Be it known that I, FRANZ FUHRMANN, a citizen of the Empire of Germany, residing in Berlin, Germany, have invented certain new and useful Improvements in Processes of Making Magnesium-Peroxid Compounds, of which the following is a specification.

When soluble salts of magnesia are subjected to the action of sodium peroxid, a precipitate is obtained which consists of hydrate of magnesium containing magnesium peroxid. This precipitate when freshly precipitated can be easily decomposed by water and corresponds, approximately, to the formula $MgO_2$, $2Mg(OH)4H_2O$, or in case, as is probable, magnesium peroxid is present in the form of a hydrate it will be expressed by the formula $MgO(OH)_2, 2Mg(OH)_2, 3H_2O$ with a content of about twenty-seven per cent. $MgO_2$. Similar processes have been observed, for instance, in the manufacture of bleaching-powder from a mixture of sodium peroxid with salts of magnesium and calcium, in which process upon the addition of water precipitates containing magnesium peroxid are produced.

The object of the present invention is to avoid as much as possible the decomposing influence of the water by following certain steps and using convenient additions, and thereby not only obtaining the above-mentioned theoretical percentage, (twenty-seven per cent.,) but even to considerably exceed the latter. For this purpose the invention consists in a process of making a compound rich in magnesium peroxid, which comprises the steps of forming an aqueous mixture of a soluble magnesium salt, a corresponding ammonium salt, and sodium peroxid, adding to the mass after the resulting reaction a quantity of alcohol, and separating the precipitate from the liquid.

As examples of the way in which the invention may be carried out the following are given:

Example I: Sixty-five kilograms crystallized chlorid of magnesium are dissolved in ninety-five liters of water, and to this solution on cooling is added gradually a mixture of twenty-three kilograms sodium peroxid and thirty-two kilograms ammonium chlorid. The temperature must not exceed 20° centigrade. After the reaction is finished an addition of about fifty liters alcohol is made, and the mixture is left to stand for about half an hour, whereupon the precipitate produced is filtered off and dried at a low temperature—*i. e.*, from 50° to 60° centigrade. The dried mass is ground and mixed with water, then filtered and washed out. After repeated drying and pulverizing the product consists of a loose white tasteless powder.

Example II: Seventy-five kilograms crystallized nitrate of magnesium, forty-two liters of water, 15.6 kilograms sodium peroxid, and twenty-nine kilograms ammonium nitrate are treated in the same manner as described in Example I.

Having thus described my invention, I claim as new and desire to secure by Letters Patent—

1. The process herein described of producing a compound rich in magnesium peroxid, which consists in forming an aqueous mixture of a soluble salt, a corresponding ammonium salt and sodium peroxid, adding to the mass, after the resulting reaction, a quantity of alcohol, and separating the precipitate from the liquid, substantially as set forth.

2. The process herein described of producing a compound rich in magnesium peroxid, which consists in forming an aqueous mixture of magnesium chlorid, ammonium chlorid and sodium peroxid, adding to the mass, after the resulting reaction, a quantity of alcohol, and then separating the precipitate from the liquid, substantially as set forth.

3. The process herein described of producing a compound rich in magnesium peroxid, which consists in dissolving in water a soluble magnesium salt, allowing the solution to cool, adding gradually to the solution a mixture of the corresponding ammonium salt and sodium peroxid, adding to the mass, after the resulting reaction, a quantity of alcohol, allowing the mixture to stand, and separating the precipitate from the liquid, substantially as set forth.

4. The process herein described of producing a compound rich in magnesium peroxid, which consists in dissolving in water a soluble magnesium salt, allowing the solution to cool, adding gradually to the solution a mixture of the corresponding ammonium salt and sodium peroxid, adding to the mass, after the resulting reaction, a quantity of alcohol, allowing the mixture to stand, separating the precipitate from the liquid, and drying the precipitate at a low temperature, substantially as set forth.

5. The process herein described of producing a compound rich in magnesium peroxid, which consists in dissolving in water a soluble magnesium salt, allowing the solution to cool, adding gradually to the solution a mixture of the corresponding ammonium salt and sodium peroxid, adding to the mass, after the resulting reaction, a quantity of alcohol, allowing the mixture to stand, separating the precipitate from the liquid, drying the precipitate at a low temperature, grinding the precipitate, mixing the same with water, filtering and washing the product, and repeatedly drying and pulverizing the same, substantially as set forth.

In testimony that I claim the foregoing as my invention I have signed my name in presence of two subscribing witnesses.

FRANZ FUHRMANN.

Witnesses:
HENRY HASPER,
WOLDEMAR HAUPT.